United States Patent
Monte

(10) Patent No.: US 7,481,588 B2
(45) Date of Patent: Jan. 27, 2009

(54) OPTICAL FIBER COMPOSITE, DEVICES, AND METHODS OF MAKING SAME

(75) Inventor: Thomas D. Monte, Homer Glen, IL (US)

(73) Assignee: KVH Industries, Inc., Middleton, RI (US)

( * ) Notice: Subject to any disclaimer, the term of this patent is extended or adjusted under 35 U.S.C. 154(b) by 0 days.

(21) Appl. No.: 11/603,260

(22) Filed: Nov. 21, 2006

(65) Prior Publication Data

US 2008/0118208 A1 May 22, 2008

(51) Int. Cl.
*G02B 6/255* (2006.01)

(52) U.S. Cl. .............................. 385/96; 385/43; 385/97; 385/123; 385/146

(58) Field of Classification Search .................. None
See application file for complete search history.

(56) References Cited

U.S. PATENT DOCUMENTS

| | | | |
|---|---|---|---|
| 4,669,814 A * | 6/1987 | Dyott | ........................... 385/42 |
| 5,768,462 A | 6/1998 | Monte | |
| 6,041,149 A | 3/2000 | Monte | |
| 6,134,356 A | 10/2000 | Monte | |
| 6,718,097 B2 | 4/2004 | Dyott | |
| 6,912,345 B2 * | 6/2005 | Dautartas et al. | .............. 385/43 |
| 2003/0068149 A1 | 4/2003 | Dautartas et al. | |
| 2004/0190839 A1 * | 9/2004 | Bush et al. | ..................... 385/96 |

FOREIGN PATENT DOCUMENTS

| | | |
|---|---|---|
| GB | 2 185 127 | 7/1987 |
| WO | WO-95/24665 | 9/1995 |

OTHER PUBLICATIONS

Li (2004) "High Absorption and Low Splice Loss Properties of Hexagonal Double-Clad Fiber," IEEE Photonics Technology Letters 16(11):2502-2504.
Allen "All-fiber Gyroscope for Land Navigation," SPIE 2510:28-36.
International Search Report and Written Opinion for Application No. PCT/US07/024235 dated May 30, 2008 (13 pages).

* cited by examiner

*Primary Examiner*—Sung H Pak
*Assistant Examiner*—Chad H Smith
(74) *Attorney, Agent, or Firm*—Goodwin Procter LLP

(57) ABSTRACT

This invention relates to an optical fiber composite comprising an asymmetric optical fiber comprising a first end with a substantially non-circular cross-section, and a substantially circular clad optical fiber comprising a tapered end section which has a substantially non-circular cross section and where the asymmetric optical fiber and the substantially circular clad optical fiber are spliced together at the first and second ends. The invention also relates to methods of making such optical fiber composites and devices that include such optical fiber composites.

10 Claims, 4 Drawing Sheets

1

OPTICAL FIBER COMPOSITE, DEVICES, AND METHODS OF MAKING SAME

FIELD OF THE INVENTION

The present invention relates to two or more spliced optical fibers that may include polarization maintaining fibers with different cross-sections.

BACKGROUND

Centro-asymmetric optical fibers are those fibers having an asymmetric cross-section. Typically, asymmetric optical fibers include those that have one side of the optical fiber located near the optical guiding region, or core. The non-circular cross-section of the outer surface of such a fiber may have a predetermined geometric relationship to the transverse axes of the guiding regions, so that the orientation of those axes can easily be ascertained from the geometry of the outer, e.g flat, surface of the fiber. For example, the axes of birefringence are positioned by locating the flat of the asymmetric fiber against a flat surface or by examining the reflection from the flat, thus locating the birefringence axis no matter how far down the fiber from the reference point. Easily locating the birefringence axis on the asymmetric fiber allows low cost polarization maintaining fusion splicing to other asymmetric fibers, e.g. those fibers with a D-shaped cross-section, using e.g. industry standard fusion splicers. In contrast, circular clad polarization maintaining fibers that have a degree of internal twist lack such angular reference, making them difficult to splice without losing polarization maintaining performance.

Circular clad polarization maintaining fiber can be used in fiber optic gyroscope (FOG) sensing coils. For example, circular clad fibers may provide enhanced polarization maintaining performance and/or may have a thin coating allowing for more optical fiber in the FOG. A FOG with a higher coil volume may increase sensitivity and improve FOG performance.

However, asymmetric, e.g. D-shaped fiber can be used in e.g. other FOG components and other devices, e.g. voltage controlled attenuators, tunable filters, phase modulators, amplitude modulators, optical intensity limiters and polarization controllers. While it may be useful to splice such asymmetric fiber to circular clad fiber, dissimilar fiber optic cross-sections are difficult to splice together. For example, large transverse movements or offsets with respect to the optical mode field size between the two dissimilar fibers may be present due to, for example, asymmetrical forces from surface tension during the fusion molten glass stage. Further, even if tolerable insertion loss is achieved, such a fusion splice may be weak due to, for example, high stresses at the junction between dissimilar cross-sections.

As a result, there is a need for a method that effectively splices circular clad fiber to asymmetric fiber, and results in a fiber optic composite with high strength and low loss properties.

SUMMARY OF THE INVENTION

This disclosure is directed, at least in part, to an optical fiber composite comprising a circular clad optical fiber and an asymmetric optical fiber. The circular clad optical fiber and/or the asymmetric fiber may be polarization maintaining fiber. Such composites may have a splice loss of less than or about 1 dB.

A method of splicing a circular clad optical fiber to an asymmetric optical fiber is also provided herein, where the method may comprise any one of the steps of: cleaving a circular clad optical fiber to form a fiber section having a perpendicular end face; polishing the fiber section thereby forming a tapered section having an end face with a substantially non-circular cross-section; inserting the circular clad fiber having the tapered section and the asymmetric fiber into a fiber splicer, and fusing the circular clad fiber and the asymmetric optical fiber together forming a spliced optical fiber. A formed tapered section of the circular clad fiber may have a substantially D-shaped cross-section before fusing. The asymmetric optical fiber may be cleaved to form a substantially perpendicular end face having a substantially D-shaped cross-section before fusing.

The cleaving step of the disclosed methods may be performed before any polishing step. Such disclosed spliced optical fibers may have splice losses of less than or about 1 dB.

In particular embodiments, the circular clad fiber is a polarization maintaining fiber. When the disclosed composites include a circular clad polarization maintaining fiber, the birefringence axis of the circular clad fiber may be ascertained before any polishing step.

Also provided herein is a method of splicing a circular clad optical fiber to an asymmetric optical fiber comprising polishing the circular fiber section thereby forming a tapered section; cleaving the tapered section thereby forming an end face with a substantially non-circular cross section; inserting the circular clad fiber and the asymmetric fiber into a fiber splicer; and fusing the circular clad fiber and the asymmetric optical fiber together.

The disclosure is also directed, at least in part, to an optical fiber composite comprising an asymmetric optical fiber comprising a first end with a substantially non-circular cross-section and a substantially circular clad optical fiber comprising a tapered end section, wherein the tapered end section comprises a second end having a substantially non-circular cross section and wherein the asymmetric optical fiber and the substantially circular clad optical fiber are spliced together at the first and second ends. Such first and second ends may be fusion spliced.

The tapered end section of such a composite may be formed by cleaving the circular clad optical fiber to form an end section and polishing the end section to form the tapered end section.

Devices comprising the disclosed optical fiber composite are also contemplated herein, including for example, fiber optic gyroscopes.

BRIEF DESCRIPTION OF THE DRAWINGS

The invention is illustrated but is not limited by the annexed drawings, in which.

DETAILED DESCRIPTION

The invention is based, in part, upon the discovery that it is possible to create an optical fiber composite that includes an asymmetric optical fiber spliced to a circular clad fiber with a splice loss of less than or about 1 dB, less than about 0.9 dB, or even less than or about 0.8 dB.

Figure 1:
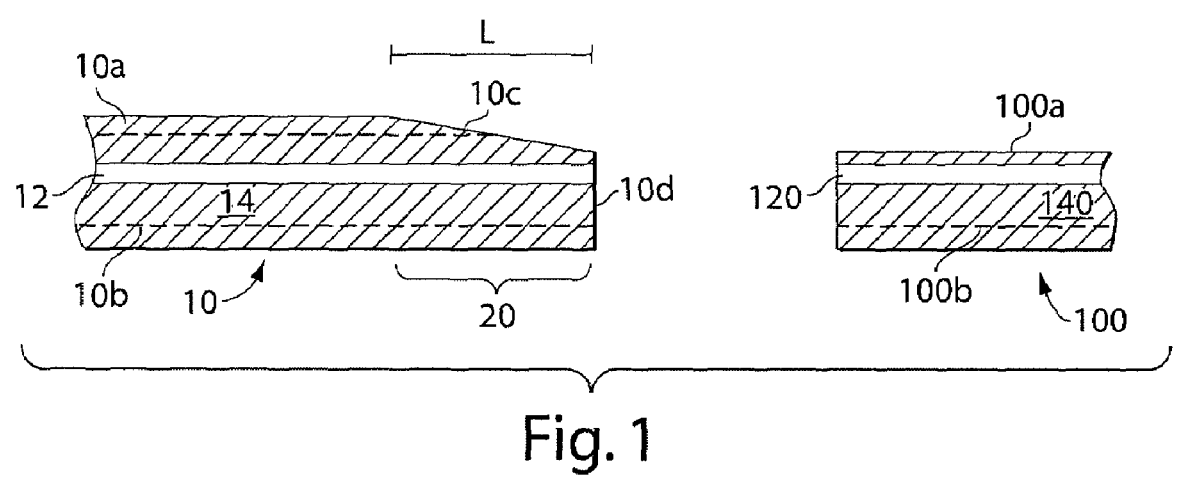
FIG. 1 is a longitudinal cross-section view of components of the optical fiber composite disclosed herein.
Figure 6:
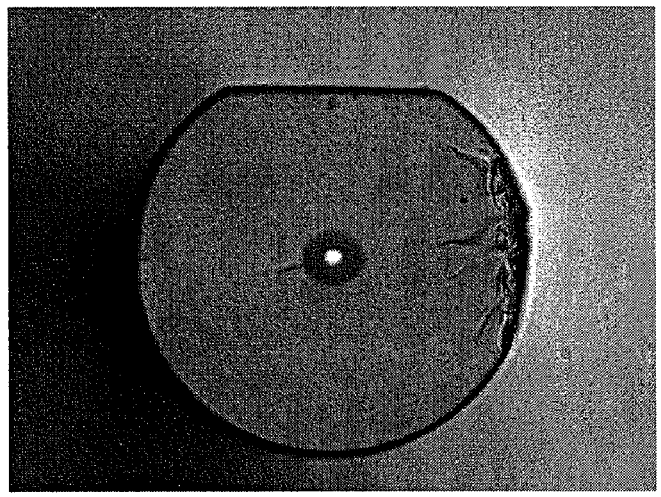
FIG. 6 depicts a transverse cross-section of 85-micron diameter top flat circular clad fiber.

In an embodiment, components of an optical fiber composite before splicing are shown in FIG. 1. Circular clad optical fiber 10 is shown in longitudinal cross-section. Fiber 10 is comprised of both a fiber core 12 and cladding 14. Both surface portions 10a and 10b may have a generally rounded shape. In some embodiments, circular clad fiber embraced by this invention may include those fibers that have a flat surface area but are not substantially D-shaped, for example as depicted in FIG. 6.

FIG. 1 also depicts asymmetric optical fiber 100 in longitudinal cross-section. Fiber 100 is comprised of a fiber core 120 and cladding 140, both of which may independently be the same as or different from fiber core 12 and cladding 14. Surface portion 100a has a substantially flat surface, e.g. a substantially flat face of fiber 100 and surface portion 100b has generally a rounded shape. Fiber core 120 may be substantially asymmetric with respect to the center of cladding 140, with core 120 closer to one surface portion 100a, of cladding 120 than to a remaining surface portion 100b of cladding 140. Such a surface portion 100a can also be referred to as a face of optical fiber 100. In some embodiments, asymmetric optical fiber 100 is an optical D-shaped fiber, as known to those skilled in the art.

Core 12 and/or core 120 may be elliptical, or may be another shape that for example supports desired modes within fiber 10 or fiber 100.

Cladding 14 or 140 may have minimal or substantially no electro-optic properties and may comprise silica. For example, cladding 14 and/or 140 may consist essentially of silica or may include a small amount of fluorine. In some embodiments, cladding 14 and/or 140 may be referred to as silica cladding. Core 12 and/or core 120 may comprise or may be fabricated from a doped silica such as for example germanium doped silica. For example, core 12 and/or 120 may include a doped silica that comprises about 25% germanium, or a germanium alloy or blend.

Figure 2A:
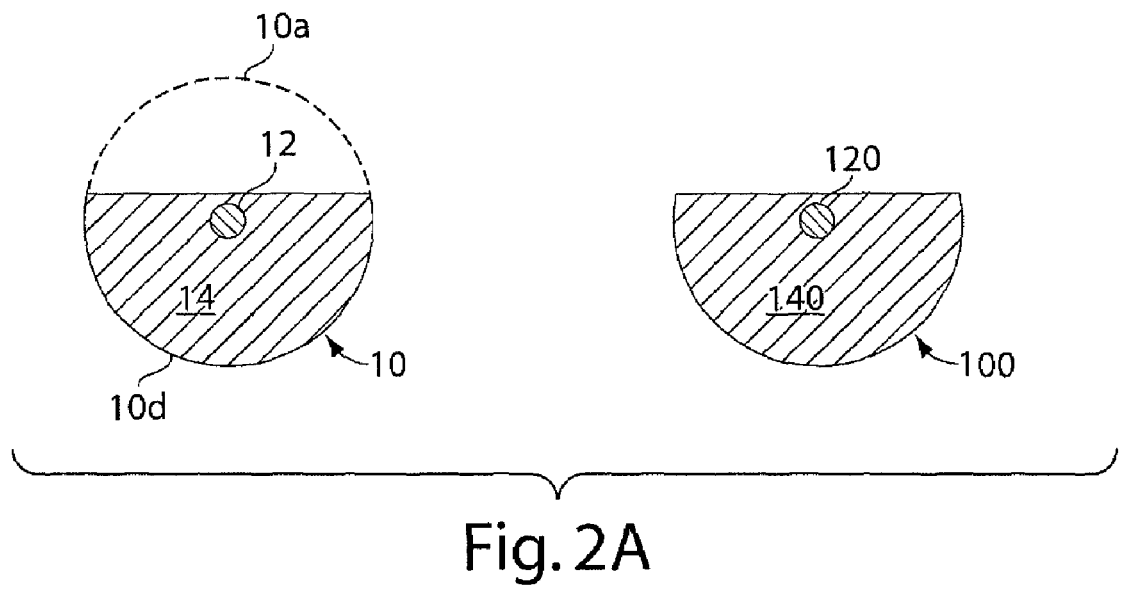
FIG. 2 is a transverse cross section view of a circular clad fiber and an asymmetric fiber prepared for splicing together.

Circular clad fiber 10 may have a tapered end section 20, that has a length L and a tapered surface 10c. FIG. 2a depicts fiber 10 and fiber 100 in transverse cross-section, before splicing. Tapered end section 20 of fiber 10 has a substantially non-circular cross-section 10d. The portion of circular fiber 10 that does not include tapered end section 20 may have a substantially circular cross-section shown as dotted line 10a.

Figure 2B:
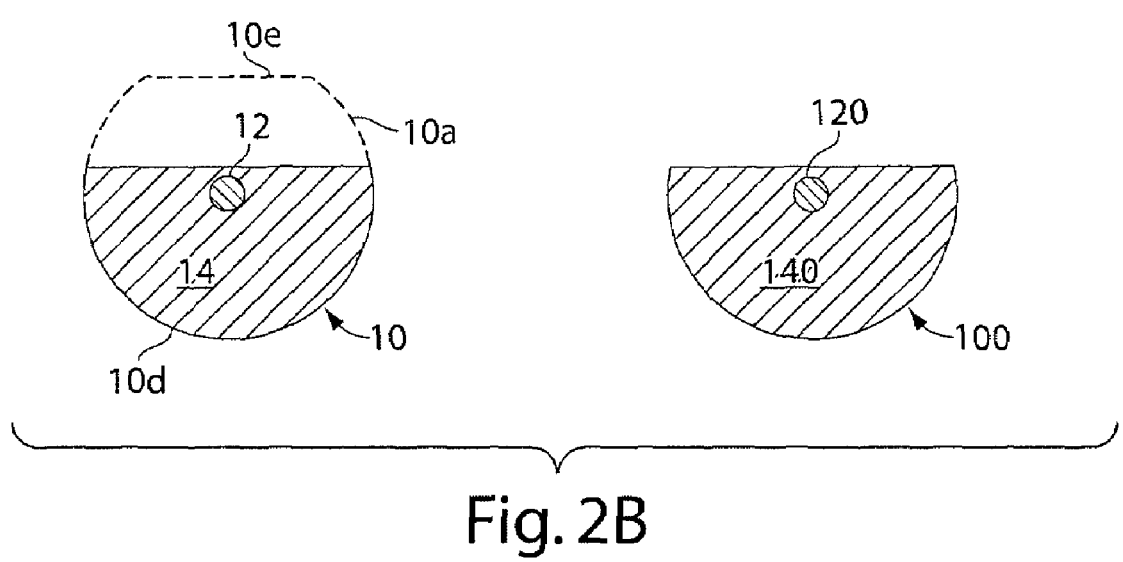

FIG. 2b depicts another embodiment of a circular clad fiber 10 before splicing to asymmetric fiber 100 that includes a flat surface portion 10e, substantially rounded surface portion 10a and 10d in the portion of fiber 10 that does not include a tapered portion.

Asymmetric fiber 100 has a substantially non-circular cross-section. In some embodiments, tapered end section 20 has substantially the same non-circular cross section end portion as asymmetric fiber 100.

Asymmetric fiber 100 and/or circular clad fiber 10 may be a polarizing maintaining fiber.

Tapered end section 20 and tapered surface 10c may be formed by an edge polishing technique. For example, circular clad fiber 10 may be first be cleaved to form an end section with a perpendicular face. In an exemplary embodiment, the circular clad fiber is a polarization maintaining fiber and the birefringence axis must then be located before splicing. Location of such a birefringence axis can be monitored actively by, for example, launching polarized light into the fiber and detecting the radiation from the cleaved facet through a crossed polarizer, or by other angular alignment means such as those based on side viewing of the optical fiber. After locating the birefringence axis, the circular clad fiber can be locked down and/or the angular orientation pre-aligned, using e.g. a clamp or fiber-holder, in order to maintain the polarization through a splice between an asymmetric and a circular clad polarization maintaining fiber.

Figure 3:
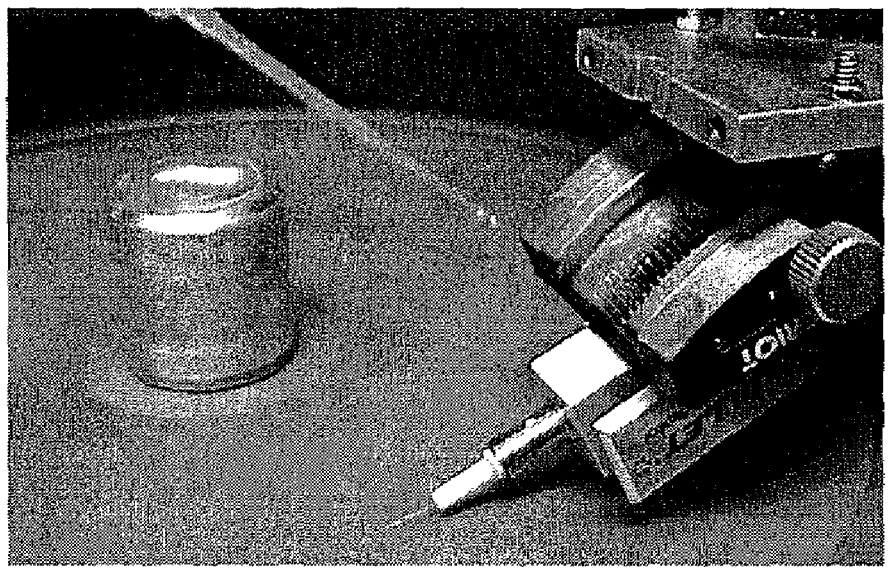
FIG. 3 depicts edge polishing the cleaved end of a circular clad fiber.
Figure 4:
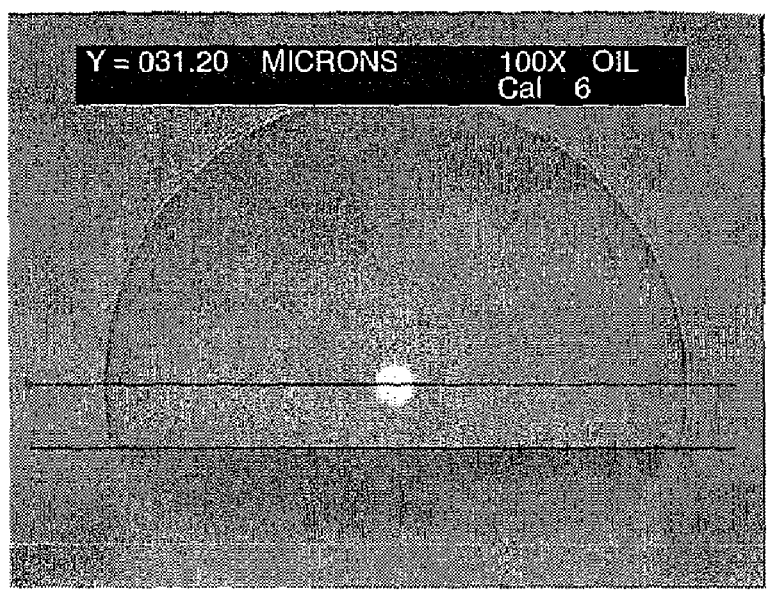
FIG. 4 depicts a transverse cross-section at the cleaved end of an edge polished circular clad fiber.
Figure 5:
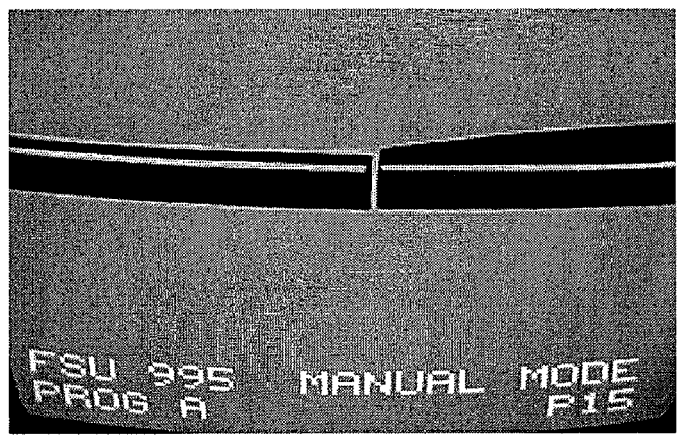
FIG. 5 depicts a side view in fusion splicer of D-shape fiber (left) and edge polished circular clad fiber (right) before fusion.

FIG. 3 shows the cleaved edge of a circular clad fiber undergoing polishing. The cleaved end of the fiber extends a predetermined distance from the holder and is lowered gradually to meet the polisher. The resultant edge polished fiber is shown in FIG. 4. Tapered section 20, in a preferable embodiment, has an intact core 12. FIG. 5 depicts a side view of the edge polished circular clad fiber aligned with a fiber with a D-shape cross section. In some embodiments, splice loss, which usually depends on the mismatch between the fiber mode fields, may be less due to thermal diffusion of the core to clad boundary of the higher index difference optical fiber. For example, D-shaped fiber with an elliptical core has an index difference between the core and the cladding of about 0.025 to about 0.038; circular clad fibers such as telecom fibers and other types of polarization maintaining fibers usually have a much lower index of refraction difference between the core and cladding. i.e. about 0.01 to about 0.015.

The asymmetric optical fiber may be cleaved in preparation for splicing to the circular clad fiber. Both the asymmetric optical fiber and the end portion including an asymmetric cross section of a circular clad optical fiber can be inserted into, e.g. a fusion splicer, aligned, and fused.

In some embodiments, asymmetric optical fiber such as elliptical core 1550 nm D-shaped fiber from KVH Industries, Inc. (Middleton, R.I.) may be spliced to SMF-28 fiber from Corning, Inc. (Corning, N.Y.) using methods described herein.

In another embodiment, the tapered section 20 and taper 10c of circular clad fiber may be formed by a side-polishing technique. In this embodiment, the angular orientation of a polarization maintaining circular clad fiber is found by a side viewing method, such as those known by one skilled in the art. The circular clad fiber can then be clamped into position and side-polished to remove a region of cladding from one side of the fiber to create a tapered section. Fiber 10 may then be cleaved to create the, e.g. D-shaped cross-section. The asymmetric fiber 100 may then be prepared for splicing by cleaving that fiber, and both fibers may then be placed into e.g. a fusion splicer, aligned, and fused.

In another embodiment, this disclosure provides for a fiber shape that may allow for a quick finding of the birefringence axis for the edge polishing alignment, while still maintaining advantages of a circular clad fiber. Such a fiber is depicted in FIG. 6. One such exemplary fiber would include for example, a 85 μm diameter fiber with a center core to flat dimension of 36 μm, with a flat approximately 45 μm wide. The percentage of the cross-section deviating from a circular cross-section may be about 3% to about 5%.

The flat top surface of a fiber such as depicted in FIG. 6 may have enough surface area to allow finding of the birefringence axis, but may not be large enough to disrupt the application of any thin coating. For example, application of a coating to a larger surface may clump or otherwise affect any polarization maintaining performance of the fiber.

Figure 7:
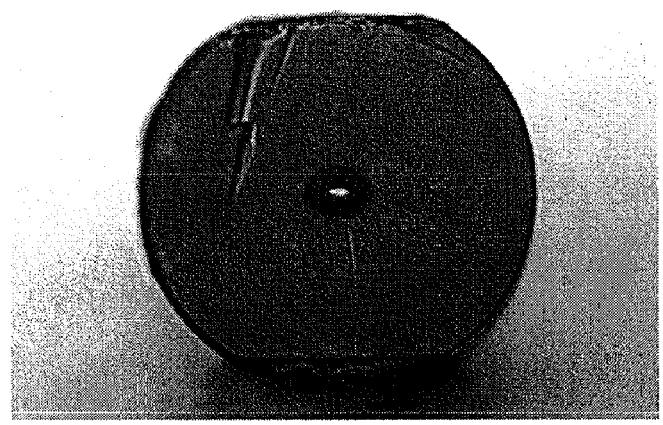
FIG. 7 depicts a transverse cross-section of 85-micron diameter top and bottom flat circular clad fiber.

Such a small flat top surface is not close enough for accessing the optical field as required for the components, i.e. couplers and polarizers, but may be used to find the birefringent axes of the fiber, e.g. an angular alignment method can be used to find the glint or reflection off of the small flat, or a fixed mechanical flat stop. In some embodiments, such a small flat top surface may be not large enough to interfere with the application of any thin coating. In another embodiment, a fiber shape is contemplated that further includes an opposing small flat to introduce symmetry as depicted in FIG. 7.

This disclosure contemplates methods of splicing and optical fiber composites of such a small top flat fiber and an asymmetric fiber as disclosed herein.

Although the present invention has been illustrated by means of preferred embodiments thereof, it is understood that the invention intends to cover broad aspects thereof without departing from the spirit and scope of the invention as defined in the appended claims.

What is claimed is:

1. An optical fiber composite comprising:
   a) an asymmetric optical fiber comprising an elliptical core and a first end with a substantially non-circular cross-section; and
   b) a substantially circular clad optical fiber comprising a tapered end section, wherein said tapered end section comprises a second end having a substantially non-circular cross section; wherein said asymmetric optical fiber and said substantially circular clad optical fiber are spliced together at the first and second ends.

2. The optical fiber composite of claim 1, wherein said first and second ends are fusion spliced.

3. The optical fiber composite of claim 1, wherein the tapered end section is formed by cleaving said circular clad optical fiber to form an end section and polishing said end section to form said tapered end section.

4. The optical fiber composite of claim 1, wherein said first end has a substantially D-shaped cross section.

5. The optical fiber composite of claim 1, wherein the circular clad fiber is polarization maintaining.

6. The optical fiber composite of claim 1, wherein said composite has a splice loss of less than or about 1 dB.

7. The optical fiber composite of claim 6, wherein the splice loss is less than or about 0.8 dB.

8. The optical fiber composite of claim 4, wherein said second end has a substantially D-shaped cross section.

9. A device comprising the optical fiber composite of claim 1.

10. The device of claim 9, wherein said device is gyroscope.

* * * * *